US012659988B2

(12) United States Patent
Zou et al.

(10) Patent No.: US 12,659,988 B2
(45) Date of Patent: Jun. 16, 2026

(54) CONFIGURATIONS FOR RESOURCE-SAVING DATA TRANSMISSIONS IN SHARED SPECTRUM CHANNEL ACCESS

(71) Applicant: ZTE CORPORATION, Shenzhen (CN)

(72) Inventors: Wei Zou, Shenzhen (CN); Li Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 370 days.

(21) Appl. No.: 17/854,014

(22) Filed: Jun. 30, 2022

(65) Prior Publication Data

US 2022/0338257 A1 Oct. 20, 2022

Related U.S. Application Data

(63) Continuation of application No. PCT/CN2020/091477, filed on May 21, 2020.

(51) Int. Cl.
*H04W 74/0808* (2024.01)
*H04W 16/14* (2009.01)

(52) U.S. Cl.
CPC ....... *H04W 74/0808* (2013.01); *H04W 16/14* (2013.01)

(58) Field of Classification Search
CPC ............. H04W 74/0808; H04W 16/14; H04W 74/006
See application file for complete search history.

(56) References Cited

U.S. PATENT DOCUMENTS

| | | | |
|---|---|---|---|
| 2018/0324803 A1 | 11/2018 | Rosa et al. | |
| 2018/0331898 A1 | 11/2018 | Song et al. | |
| 2020/0045733 A1 | 2/2020 | Tiirola et al. | |
| 2020/0053777 A1 | 2/2020 | Babaei et al. | |
| 2020/0221495 A1* | 7/2020 | Chen ................... H04W 36/305 |
| 2020/0367314 A1* | 11/2020 | Belleschi ............ H04L 27/0006 |
| 2021/0235487 A1* | 7/2021 | Park ................... H04W 72/0453 |
| 2021/0250793 A1* | 8/2021 | Shi ......................... H04W 76/19 |
| 2022/0377813 A1* | 11/2022 | Wang ................ H04W 74/0841 |

FOREIGN PATENT DOCUMENTS

| | | |
|---|---|---|
| CN | 106961742 A | 7/2017 |
| CN | 109983827 A | 7/2019 |
| CN | 110959300 A | 4/2020 |

(Continued)

OTHER PUBLICATIONS

Penultimate Official Action for JP Appl. No. 2022-539676, dated Mar. 12, 2024 (with English translation, 9 pages).

(Continued)

*Primary Examiner* — Justin T Van Roie

(74) *Attorney, Agent, or Firm* — Foley & Lardner LLP

(57) ABSTRACT

Presented are systems, methods, apparatuses, or computer-readable media for configuration of resource-saving data transmissions in shared spectrum channel access. A first device may receive, from a second device, configuration information for resource-saving transmission. The first device may determine whether to use the resource-saving transmission in an unlicensed spectrum, according to the received configuration information for resource-saving transmission.

20 Claims, 9 Drawing Sheets

(56) References Cited

FOREIGN PATENT DOCUMENTS

| | | |
|---|---|---|
| CN | 111107638 A | 5/2020 |
| KR | 20200018310 A | 2/2020 |
| WO | WO-2020/019296 A1 | 1/2020 |

OTHER PUBLICATIONS

ZTE Corporation, et al., "Multiple Msg1 transmission opportunities", 3GPP TSG RAN WG2 NR #106 Meeting, R2-1906314, May 17, 2019, Reno, USA (5 pages).

ZTE Corporation, et al., "Multiple Msg1 transmission opportunities", 3GPP TSG RAN WG2 NR #107 Meeting, R2-1909163, Aug. 30, 2019, Prague, Czech Republic (5 pages).

ZTE Corporation, et al., "Multiple Msg1 transmission opportunities", 3GPP TSG RAN WG2 NR #107bis Meeting, R2-1913372, Oct. 18, 2019, Chongqing, China (5 pages).

3rd Generation Partnership Project, "Technical Specification Group Radio Access Network; NR; NR and NG-RAN Overall Description; Stage 2 (Release 16)", 3GPP TS 38.300, V16.1.0, Mar. 2020, Valbonne, France (131 pages).

Extended European Search Report for EP Appl. No. 20895885.0, dated May 4, 2023.

AT&T, "IAB Enhancements for Rel 17," 3GPP TSG RAN Plenary Meeting #84; RP-192109; Jun. 3-6, 2019; Newport Beach, USA (12 pages).

AT&T, "Wideband operation for NR-based access to unlicensed spectrum," 3GPP TSG RAN WG1 #96; R1-1901887; Feb. 25-Mar. 1, 2019; Athens, Greece (7 pages).

Convida Wireless, "Considerations on Channel Access Mechanism for NR Supporting From 52.6 GHz to 71 GHz," 3GPP TSG RAN WG1 Meeting #101-e; R1-2004594; May 25-Jun. 5, 2020, e-Meeting (6 pages).

Huawei, et al., "NRU wideband BWP operation," 3GPP TSG RAN WG1 Meeting #96; R1-1901529; Feb. 25-Mar. 1, 2019; Athens, Greece (10 pages).

Nokia, et al., "Discussion on securing SRBs with no DRBs," 3GPP TSG-RAN #79; RP-180429; Mar. 19-22, 2018; Chennai, India (5 pages).

Nokia, et al., "LBT failure handling in MAC," 3GPP TSG-RAN WG2 Meeting #109bis-e; R2-2003050; Draft Change Request 38.321 CR Num rev-Current version 16.0.0; Apr. 20-30, 2020; Elbonia (25 pages).

Notice of Reasons for Rejection on JP App. No. 2022-539676 dated Oct. 16, 2023 (with English translation, 9 pages).

NTT DOCOMO, Inc., "[D308] Necessity of initial DL/UL BWP in ServingCellConfig," 3GPP TSG-RAN WG2 #101; R2-1803625; Feb. 26-Mar. 2, 2018; Athens, Greece (8 pages).

Qualcomm Incorporated, "General description and data volume reporting for NR in unlicensed bands," 3GPP TSG-SA WG2 Meeting #135; S2-1909562; Change Request 23.501 CR 1845 rev—Current version: 16.2.0; Oct. 14-18, 2019; Split, Croatia (5 pages).

Sharp, "UL signals and channels for NR-U," 3GPP TSG RAN WG1#99 Meeting; R1-1912756; Nov. 18-22, 2019; Reno, USA (10 pages).

International Search Report and Written Opinion for PCT Appl. No. PCT/CN2020/091477 mailed Nov. 26, 2020 (9 pages).

First Office Action for CN Appl. No. 202080100622.5, dated Jul. 29, 2024 (with English translation, 15 pages).

NTT DOCOMO, Inc., "Study on New Radio Access Technology", 3GPP TSG RAN Meeting #75, RP-170376, Mar. 9, 2017, Dubrovnik, Croatia (157 pages).

* cited by examiner

600 gNB

UE

*SIB 605*

*[with the enable info for resource-saving transmission]*

UE Start to Use
Resource-Saving
Transmission Mode in NR-U
610

CONFIGURATIONS FOR RESOURCE-SAVING DATA TRANSMISSIONS IN SHARED SPECTRUM CHANNEL ACCESS

CROSS-REFERENCE TO RELATED APPLICATION

This application claims the benefit of priority under 35 U.S.C. § 120 as a continuation of PCT Patent Application No. PCT/CN2020/091477, filed on May 21, 2020, the disclosure of which is incorporated herein by reference in its entirety.

TECHNICAL FIELD

The disclosure relates generally to wireless communications, including but not limited to systems and methods for configuration of resource-saving data transmissions in shared spectrum channel access.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A first device may receive, from a second device, configuration information for resource-saving transmission. The first device may determine whether to use the resource-saving transmission in an unlicensed spectrum, according to the received configuration information for resource-saving transmission.

In some embodiments, the first device may include a user equipment (UE), and the second device may include a base station or a next-generation nodeB (gNB). In some embodiments, the first device may include a base station or a next-generation nodeB (gNB), and the second device may include a core network entity.

In some embodiments, the core network entity comprises an operations, administration and management (OAM) entity or an access and mobility management function (AMF). In some embodiments, the first device may include a distributed unit (DU) of a next-generation nodeB (gNB), and the second device may include a centralized unit (CU) of the next-generation nodeB (gNB).

In some embodiments, the first device may receive, from the second device, the configuration information via a system information block (SIB). The configuration information may include enabling information for the resource-saving transmission. In some embodiments, the first device may receive, from the second device, the configuration information via a dedicated radio resource control (RRC) signaling.

In some embodiments, the first device may receive, from the second device, the configuration information via a F1 application protocol (F1AP) message. The first device may include a distributed unit (DU) and the second device may include a centralized unit (CU). In some embodiments, the first device may send, to the second device, a message in response to the received configuration information.

In some embodiments, the configuration information may include at least one condition. In some embodiments, the first device may determine that the at least one condition is satisfied. In some embodiments, the first device may determine, responding to the at least one condition being satisfied, to use the resource-saving transmission in the unlicensed spectrum.

In some embodiments, the configuration information includes at least one of: enable information for downlink resource-saving transmission for each corresponding bandwidth part (BWP); enable information for downlink resource-saving transmission for all BWPs; enable information for uplink resource-saving transmission for each corresponding BWP; enable information for uplink resource-saving transmission for all BWPs; enable information for uplink resource-saving transmission for each corresponding BWP for use by a group of the first device; enable information for uplink resource-saving transmission for all BWPs for use by a group of the first device; an allowable minimum number of subbands that each has a successful listen-before-talk (LBT) operation for downlink or uplink resource-saving transmission; an allowable maximum number of subbands that each has a failed LBT operation for downlink or uplink resource-saving transmission; an allowable minimum ratio of a number of subbands that each has a successful LBT operation, to a number of all subbands for downlink or uplink resource-saving transmission; an allowable maximum ratio of a number of subbands that each has a failed LBT operation, to the number of all subbands for downlink or uplink resource-saving transmission; a total number of failed LBT operations in all subbands during a specified time duration for downlink or uplink resource-saving transmission; or an index of an anchor subband whose LBT result determines whether to perform downlink or uplink resource-saving transmission.

In some embodiments, the configuration information may be included in at least one information element, comprising: a BWP-UplinkCommon, BWP-UplinkDedicated, BWP-DownlinkCommon, BWP-DownlinkDedicated, PUSCH-Config, PUSCH-ConfigCommon, PDSCH-Config, or PDSCH-ConfigCommon information element.

In some embodiments, the higher layer of the first device may receive, from the lower layer of the first device, an indication of a subband listen-before-talk (LBT) failure. In some embodiments, the higher layer of the first device may determine data to be transmitted, according to the indication of the subband LBT failure. In some embodiments, the indication of the subband LBT failure may include at least one of: a number of the subbands where LBT fails, at least one index of a subband having a failed LBT operation, a total amount of data sent in one or more subbands having a successful LBT operation, or an index of a bandwidth part (BWP) of the subbands involved in the resource-saving transmission.

At least one aspect is directed to a system, method, apparatus, or a computer-readable medium. To a first device, a second device may transmit configuration information for resource-saving transmission. The first device may be caused to determine whether to use the resource-saving transmission in an unlicensed spectrum, according to the configuration information for resource-saving transmission.

In some embodiments, the first device may include a user equipment (UE), and the second device may include a base station or a next-generation nodeB (gNB). In some embodiments, the first device may include a base station or a next-generation nodeB (gNB), and the second device may include a core network entity.

In some embodiments, the core network entity may include an operations, administration and management (OAM) entity or an access and mobility management function (AMF). In some embodiments, the first device may include a distributed unit (DU) of a next-generation nodeB (gNB), and the second device may include a centralized unit (CU) of the next-generation nodeB (gNB).

In some embodiments, the second device may transmit, to the first device, the configuration information via a system information block (SIB). The configuration information may include enabling information for the resource-saving transmission. In some embodiments, the second device may transmit, to the first device, the configuration information via a dedicated radio resource control (RRC) signaling.

In some embodiments, the second device may transmit, to the first device, the configuration information via a F1 application protocol (F1AP) message. The first device may include a distributed unit (DU) and the second device may include a centralized unit (CU). In some embodiments, the second device may receive, from the first device, a message in response to the transmitted configuration information.

In some embodiments, the configuration information may include at least one of: enable information for downlink resource-saving transmission for each corresponding bandwidth part (BWP); enable information for downlink resource-saving transmission for all BWPs; enable information for uplink resource-saving transmission for each corresponding BWP; enable information for uplink resource-saving transmission for all BWPs; enable information for uplink resource-saving transmission for each corresponding BWP for use by a group of the first device; enable information for uplink resource-saving transmission for all BWPs for use by a group of the first device; an allowable minimum number of subbands that each has a successful listen-before-talk (LBT) operation for downlink or uplink resource-saving transmission; an allowable maximum number of subbands that each has a failed LBT operation for downlink or uplink resource-saving transmission; an allowable minimum ratio of a number of subbands that each has a successful LBT operation, to a number of all subbands for downlink or uplink resource-saving transmission; an allowable maximum ratio of a number of subbands that each has a failed LBT operation, to the number of all subbands for downlink or uplink resource-saving transmission; a total number of failed LBT operations in all subbands during a specified time duration for downlink or uplink resource-saving transmission; or an index of an anchor subband whose LBT result determines whether to perform downlink or uplink resource-saving transmission.

In some embodiments, the configuration information may be included in at least one information element, comprising: a BWP-UplinkCommon, BWP-UplinkDedicated, BWP-DownlinkCommon, BWP-DownlinkDedicated, PUSCH-Config, PUSCH-ConfigCommon, PDSCH-Config, or PDSCH-ConfigCommon information element.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| AMF | Access and Mobility Management Function |
| BFR | Beam Failure Recovery |
| BWP | Bandwidth Part |
| CCA | Clear Channel Assessment |
| CN | Core Network |
| CU | Centralized Unit |
| DC | Dual Connectivity |
| DCI | Downlink Control Information |
| DL | Down Link or Downlink |
| DN | Data Network |
| DRS | Discovery Reference Signal |
| DU | Distributed Unit |
| F1AP | F1 Application Protocol |
| FR | Frequency Range |
| LBT | Listen Before Talk |
| MAC | Medium Access Control |
| MAC-CE | Medium Access Control (MAC) Control Element (CE) |
| NW | Network |
| NR-U | Unlicensed Spectrum |
| OAM | Operations, Administration and Management |
| OFDM | Orthogonal Frequency-Division Multiplexing |
| OFDMA | Orthogonal Frequency-Division Multiple Access |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PUCCH | Physical uplink control channel |
| QCL | Quasi-Co-Location |
| QoS | Quality of Service |
| RACH | Random Access Channel |
| RAN | Radio Access Network |
| RE | Resource Element |
| RLC | Radio Link Control |
| RS | Reference Signal |
| RSRP | Reference Signal Received Power |
| RRC | Radio Resource Control |
| SIB | System Information Block |
| SSB | Synchronization Signal Block |
| SRS | Sounding Reference Signal |
| TC | Transmission Configuration |
| TCI | Transmission Configuration Indicator |
| UE | User Equipment |
| UL | Up Link or Uplink |

1. Mobile Communication Technology and Environment

Figure 1:
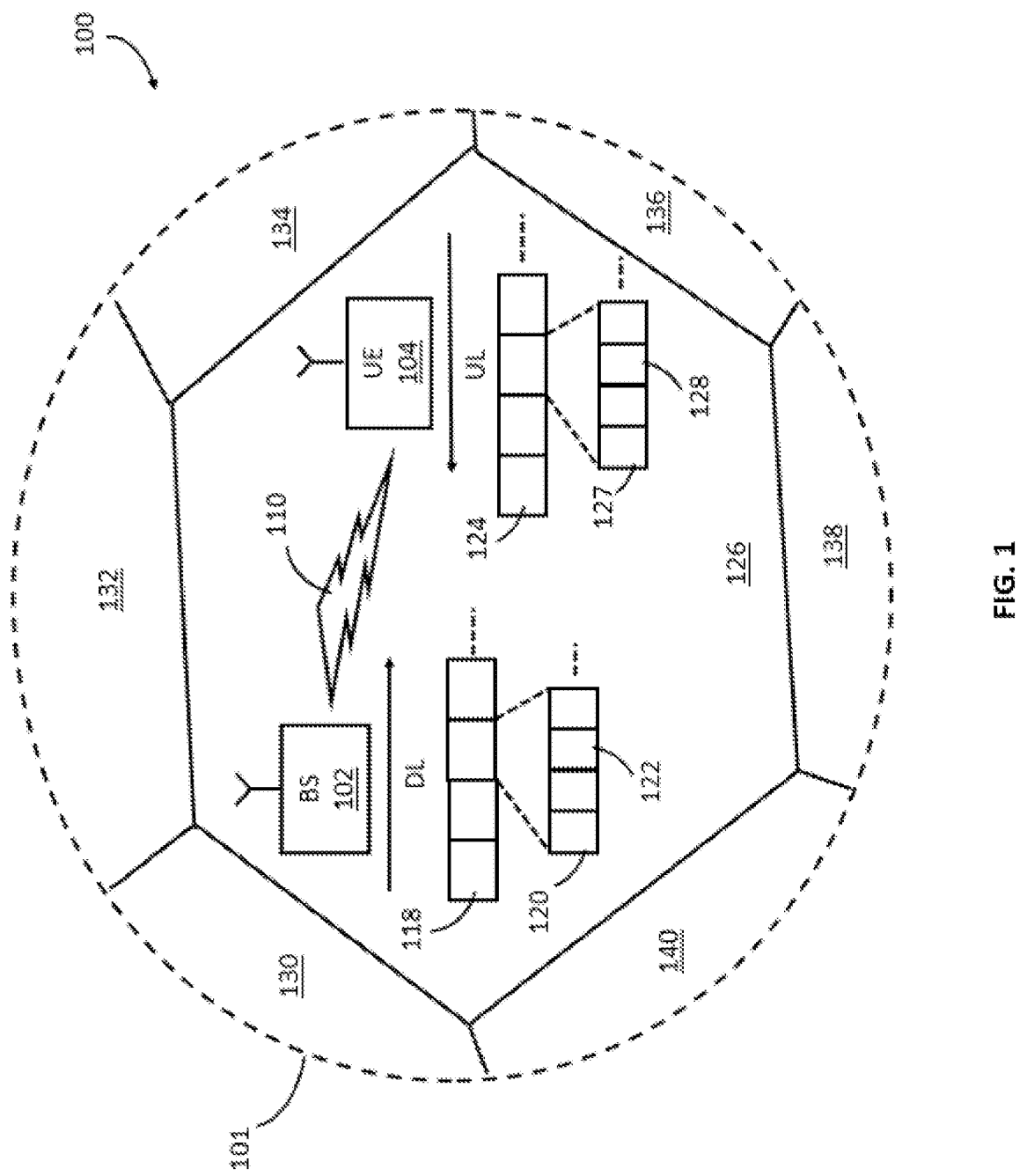
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
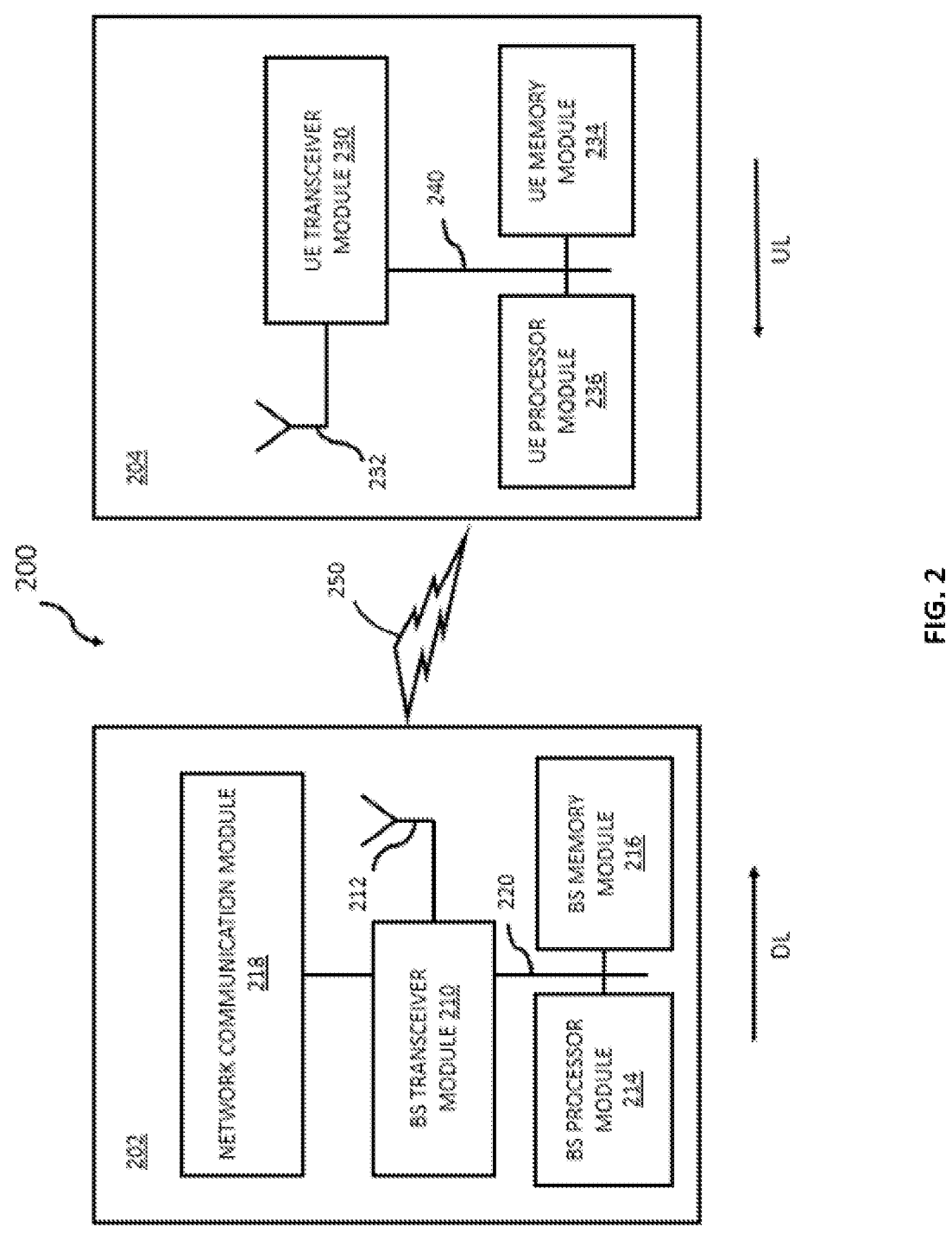
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD- ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Configuration of Resource-Saving Data Transmission in Shared Spectrum Channel Access There may be technical challenges in communication over shared spectra (e.g., NR-U) regarding how to decide whether to transmit data or not in a BWP or the allocated resource containing multiple LBT subbands and how to make the related configuration in NR-U system. In NR-U system, a listen-before-talk (LBT) failure may have to be reported from a PHY layer to a MAC layer so that the MAC layer can schedule the following data transmission according to the resource allocation information. At PHY layer, a real-time LBT measurement (e.g., CCA measurement) may be performed at each LBT subband (e.g., at a 20 MHz band or RB set), and the LBT failure in each subband may be determined according to the detailed criterion in PHY layer as specified in 3GPP specifications.

Figure 3:
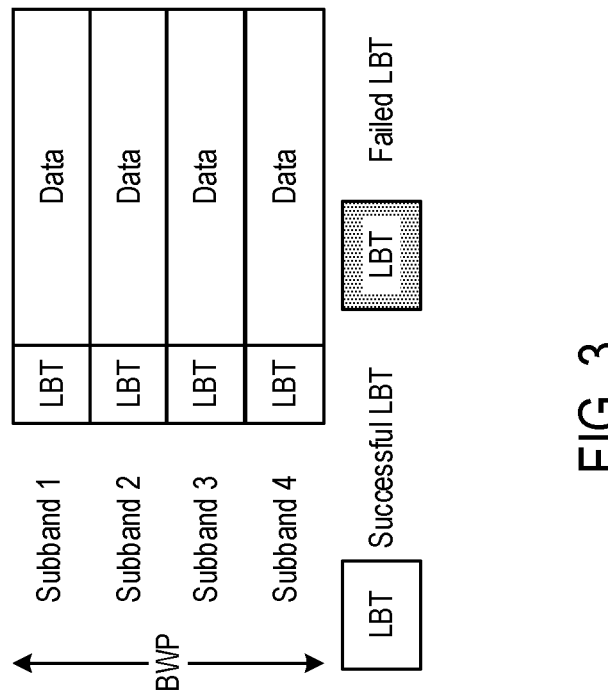
FIG. 3 illustrates a block diagram of data transmission after listen before talk (LBT) successes in every subband.
Figure 4:
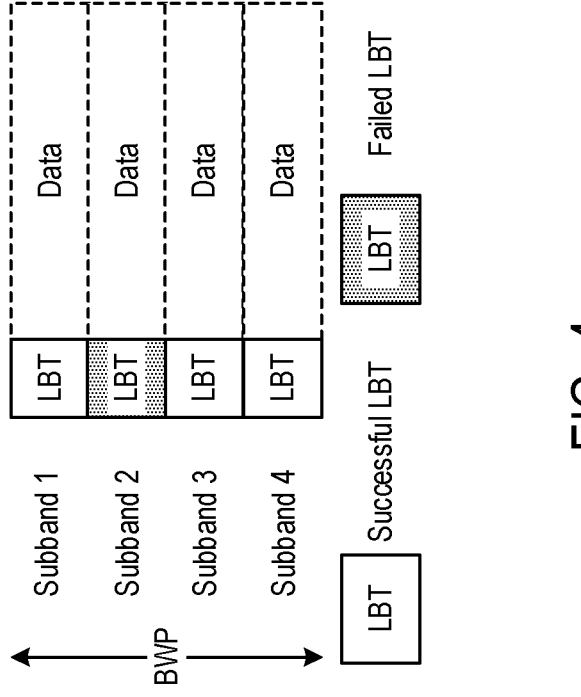
FIG. 4 illustrates a block diagram of data transmission after one listen before talk (LBT) failure in one of the subbands.

However, the allocated resource to each UE in a BWP at MAC layer may contain multiple LBT subbands. It should also be decided at first whether data can be transmitted if LBT succeed in some of the subbands, while failed at the other subbands. The 3GPP Rel-16 specifies that data may not be transmitted once LBT failed in one of the subbands in the allocated resource, as shown in FIGS. 3 and 4. This may lead to lots of resource waste because data could not be transmitted at some subbands even though LBT succeeds in such subbands, once one of subband has a failed LBT.

Figure 5:
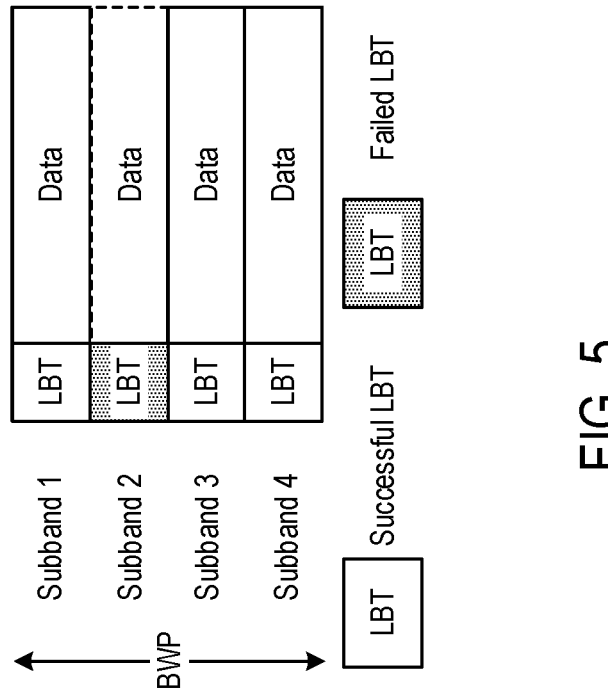
FIG. 5 illustrates is a block diagram of data transmission in subbands with listen before talk (LBT) successes.

Referring now to FIG. 5, a resource-saving data transmission mode is shown. In this configuration, data may be transmitted at the subband where LBT succeeds even though LBT fails in some other subbands. Presented herein are systems and methods to enable the resource-saving data transmission (or high efficiency data transmission). To that end, the configuration information may contain or include one or more of the following:

enable information for DL resource-saving transmissions for all BWPs (e.g., transmitted from CN entity to gNB, where CN entity could be an OAM entity, AMF, or other CN entity);

enable information for DL resource-saving transmissions for each corresponding BWP (e.g., transmitted from CN entity to gNB, where CN entity could be an OAM entity, AMF, or other CN entity);

enable information for DL resource-saving transmissions for all BWPs (e.g., transmitted from gNB CU to gNB DU);

enable information for DL resource-saving transmissions for each corresponding BWP (e.g., transmitted from gNB CU to gNB DU);

enable information for UL resource-saving transmissions for all BWPs from gNB to all UEs;

enable information for UL resource-saving transmissions for each corresponding BWP (e.g., transmitted from gNB to all UEs)

enable information for UL resource-saving transmissions for all BWPs (e.g., transmitted from gNB CU to a UE or a UE class)

enable information for UL resource-saving transmissions for each corresponding BWP (e.g., transmitted from gNB CU to a UE or a UE class)

allowable minimum number of subbands that each has a successful LBT operation for DL/UL resource-saving transmission;

allowable maximum number of subbands that each has a failed LBT for DL/UL resource-saving transmission;

allowable minimum ratio of number of LBT-successful subbands, to number of all the subbands for DL/UL resource-saving transmission allowable maximum ratio of a number of LBT-failed subbands, to the number of all the subbands for DL/UL resource-saving transmission;

total number of LBT failures in all the contained subbands during a specified time duration for DL/UL resource-saving transmission; and index of an anchor subband whose LBT result will decide whether to perform DL/UL resource-saving transmissions Furthermore, the above configuration information may be communicated or contained in the following signaling:

system information from gNB, such as system information block (SIB);

dedicated radio resource control (RRC) signaling; and

DU configuration signaling in F1 application protocol (F1AP) in the centralized unit/distributed unit (CU/DU)-split case.

Furthermore, the above configuration information could be contained in the following IE in the dedicated RRC signaling:

BWP-UplinkCommon
BWP-UplinkDedicated
BWP-DownlinkCommon
BWP-DownlinkDedicated
PUSCH-Config
PUSCH-ConfigCommon
PDSCH-Config
PDSCH-ConfigCommon To enable the resource-saving data transmission mentioned above, PHY layer may also be notified about the above-mentioned configuration information after the information is received. The PHY layer may perform resource-saving transmission if the conditions in configured information are satisfied. Otherwise, the PHY layer may transmit the data when LBT succeeds in all the subbands contained in the transmission resource block (e.g., as defined in 3GPP Rel-16).

After the data transmission at PHY layer, the PHY layer may provide the following information to MAC layer:

sub-band LBT failure indication; and an overall LBT failure indication when legacy transmission mode is selected.

Furthermore, subband LBT failure indication could contain the following information:

Number of subbands where the LBT fails;

One or more Indexes of subbands where the LBT fails;

BWP index of the involved subbands; and

Total data amount sent in the subbands where the LBT succeeded.

Figure 6:
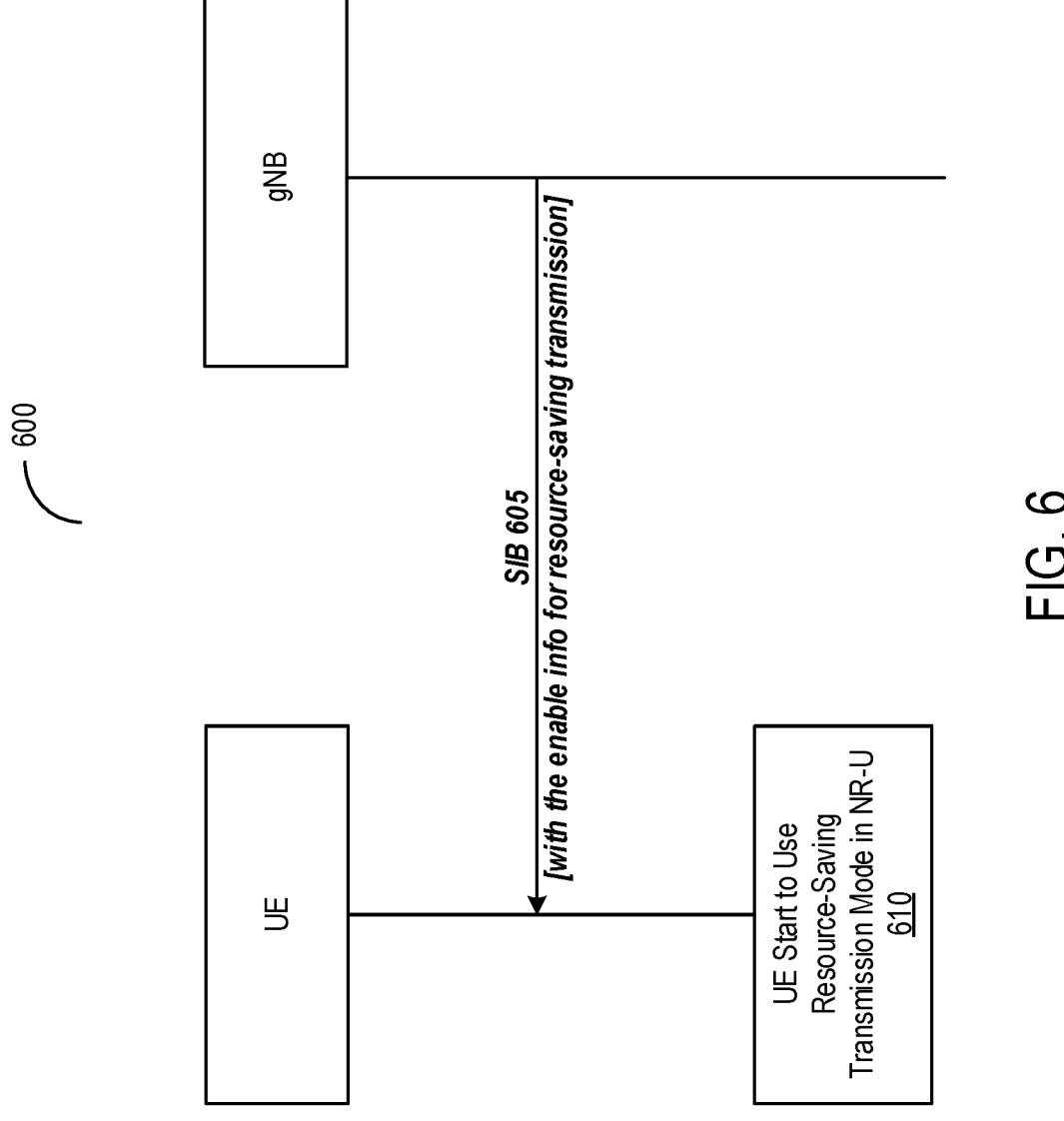
FIG. 6 illustrates a sequence diagram of a data flow for resource-saving data transmission configuration enabled by system information blocks (SIBs)

Referring now to FIG. 6, depicted is a sequence diagram of a data flow 600 for resource-saving data transmission configuration enabled by system information blocks (SIBs). As depicted, an enabling information may be delivered from gNB to UE. After the UE receive the enabling information, the UE may enable the resource-saving transmission mode (e.g., as shown in FIG. 5) in the NR-U. Otherwise, legacy transmission mode may be applied and data may not be transmitted once LBT failed in one of the subbands in the allocated resource (e.g., as shown in FIGS. 3 and 4). At 605, the gNB may broadcast a system information block (SIB). The SIB may include enabling information for resource-saving transmission. At 610, the UE may detect the enabling information contained in the SIB and use the resource-saving transmission in the following NR-U data transmission.

Figure 7:
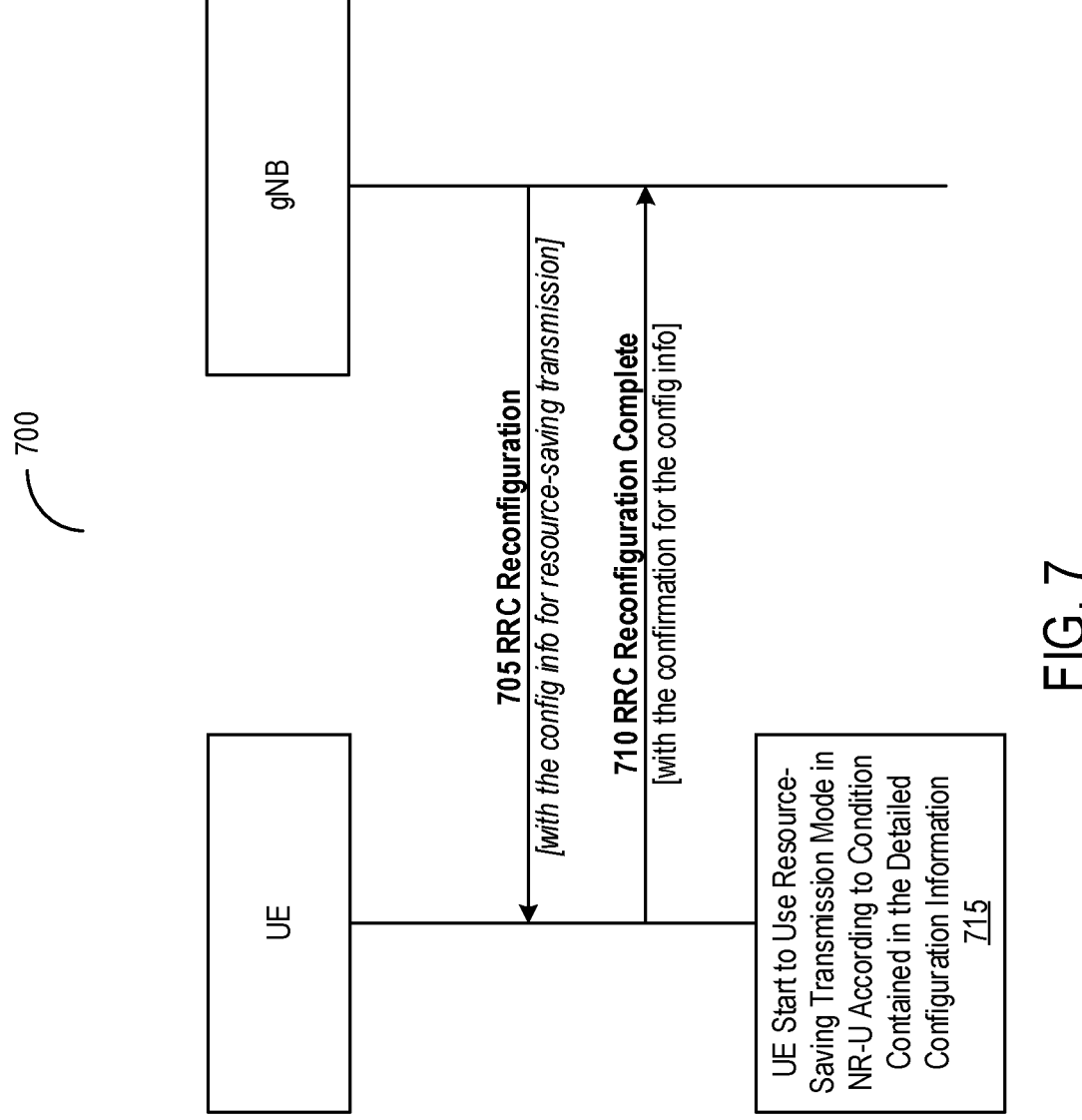
FIG. 7 illustrates a sequence diagram of a data flow for resource-saving data transmission configuration using dedicated radio resource control (RRC) signals.

Referring now to FIG. 7, depicted is a sequence diagram of a data flow 700 for resource-saving data transmission configuration using dedicated radio resource control (RRC) signals. As depicted, a set of configuration information for resource-saving data transmission may be delivered from gNB to UE by dedicated RRC signaling. After UE receive the configuration information, the UE may enable the resource-saving transmission mode based on the received configuration information. In the configuration information, one or more conditions may be included. When the conditions are satisfied, the UE may apply the resource-saving data transmission mode. Otherwise, legacy transmission mode may be applied and data may not be transmitted once LBT failed in one of the subbands in the allocated resource (e.g., in FIGS. 3 and 4).

At 705, a gNB may send a dedicated RRC signaling (e.g., RRC Reconfiguration message) to a UE. The configuration information for resource-saving transmission is contained. The configuration information could contain one or multiple of the following information:

enable information for DL resource-saving transmissions for all BWPs (e.g., transmitted from CN entity to gNB, where CN entity could be an OAM entity, AMF, or other CN entity);

enable information for DL resource-saving transmissions for each corresponding BWP (e.g., transmitted from CN entity to gNB, where CN entity could be an OAM entity, AMF, or other CN entity);

enable information for DL resource-saving transmissions for all BWPs (e.g., transmitted from gNB CU to gNB DU);

enable information for DL resource-saving transmissions for each corresponding BWP (e.g., transmitted from gNB CU to gNB DU);

enable information for UL resource-saving transmissions for all BWPs from gNB to all UEs;

enable information for UL resource-saving transmissions for each corresponding BWP (e.g., transmitted from gNB to all UEs);

enable information for UL resource-saving transmissions for all BWPs (e.g., transmitted from gNB CU to a UE or a UE class);

enable information for UL resource-saving transmissions for each corresponding BWP (e.g., transmitted from gNB CU to a UE or a UE class);

allowable minimum number of subbands that each has a successful LBT operation for DL/UL resource-saving transmission;

allowable maximum number of subbands that each has a failed LBT for DL/UL resource-saving transmission;

allowable minimum ratio of number of LBT-successful subbands, to number of all the subbands for DL/UL resource-saving transmission;

allowable maximum ratio of a number of LBT-failed subbands, to the number of all the subbands for DL/UL resource-saving transmission;

total number of LBT failures in all the contained subbands during a specified time duration for DL/UL resource-saving transmission; and index of an anchor subband whose LBT result will decide whether to perform DL/UL resource-saving transmissions.

Furthermore, the above configuration information may be included in the following IE in the dedicated RRC signaling:

BWP-UplinkCommon
BWP-UplinkDedicated
BWP-DownlinkCommon
BWP-DownlinkDedicated
PUSCH-Config
PUSCH-ConfigCommon
PDSCH-Config
PDSCH-ConfigCommon For example, for UL transmission at UE, a new parameter as shown below may be added in IE PUSCH-Config as follows. The IE PUSCH-Config may be used to configure the UE specific PUSCH parameters applicable to a particular BWP.

| PUSCH-Config information element: |
|---|
| -- ASN1START |
| -- TAG-PUSCH-CONFIG-START |
| PUSCH-Config ::= SEQUENCE { |
|     resourceSavingTxConfig OPTIONAL, -- Need R |
| } |
| ResourceSavingTxConfig ::= SEQUENCE { |
|     EnablingDL BOOLEAN |
|     EnablingUL BOOLEAN |
|     allowedMaxNumofLBTFailDL INTEGER (0..10) OPTIONAL, |
|     -- Need R |
|     allowedMaxNumofLBTFailUL INTEGER (0..10) OPTIONAL, |
|     -- Need R |
|     allowedMinNumofLBTSuccessDL INTEGER (0..10) OPTIONAL, |
|     -- Need R |
|     allowedMinNumofLBTSuccessUL INTEGER (0..10) OPTIONAL, |
|     -- Need R |
|     } |
| TAG-REPORTCONFIGINTERRAT-STOP |
| ASN1STOP |

At 710, the UE send a RRC response message (e.g., RRC Reconfiguration Complete message) to confirm the reception the RRC message from the gNB. At 715, UE may start resource-saving transmission mode according to the configuration information in the following NR-U data transmission. In the configuration information, one or more conditions may be included. When the conditions are satisfied, UE may apply the resource-saving data transmission mode (e.g., as depicted in FIG. 5). Otherwise, legacy transmission mode would be applied (e.g., as depicted in FIGS. 3 and 4).

Figure 8:
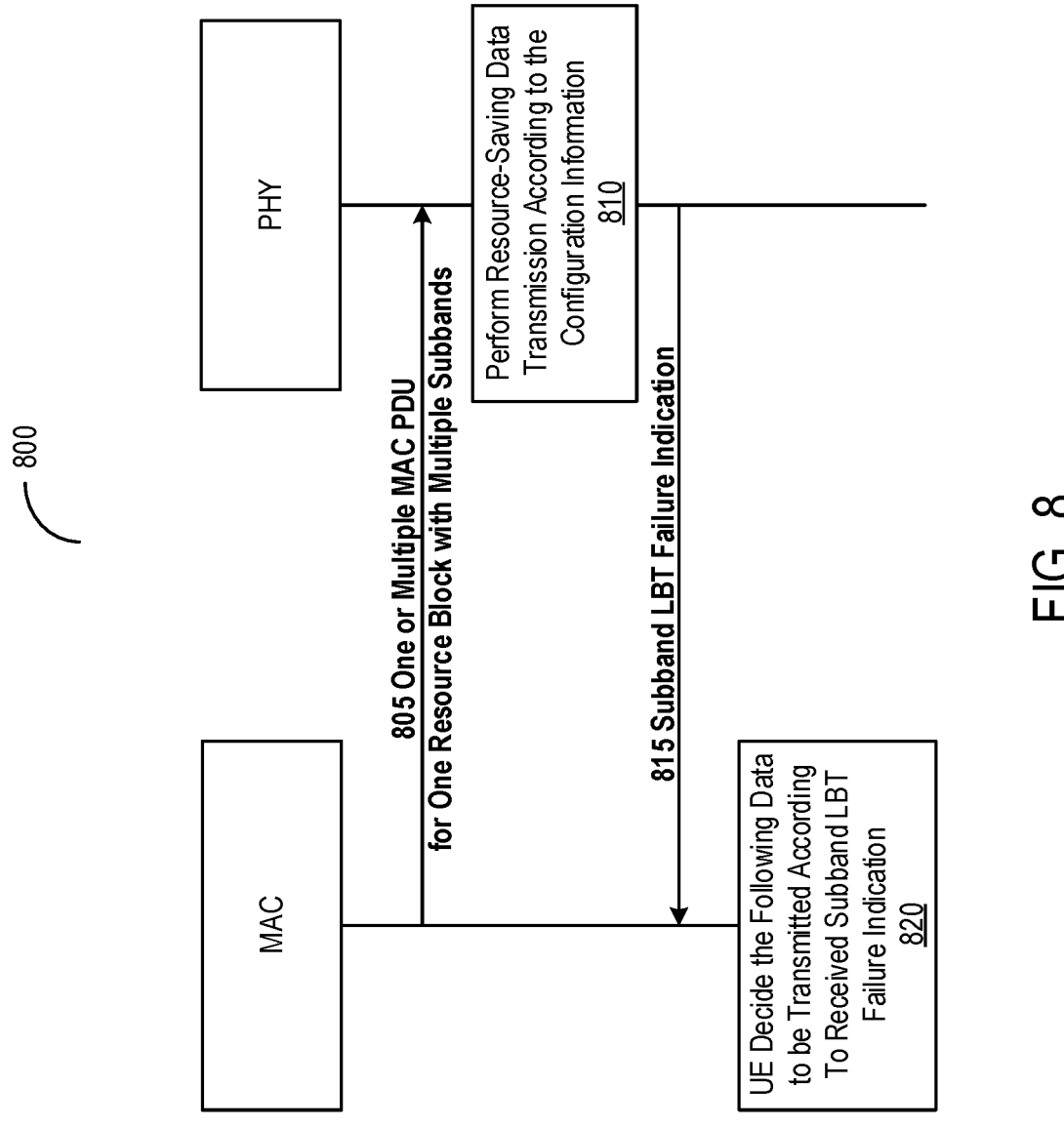
FIG. 8 illustrates a sequence diagram of data flow between a media access control (MAC) layer and a physical (PHY) layers in a resource-saving data transmission configuration.

Referring now to FIG. 8, depicted is a sequence diagram of data flow 800 between a media access control (MAC) layer and a physical (PHY) layers in a resource-saving data transmission configuration. As depicted, the interaction between MAC and PHY is described when resource-saving data transmission is applied. The configuration information for resource-saving data transmission may be delivered to PHY layer. Upon receipt, the PHY layer may make a decision whether to use the configuration information based on the LBT result at each subband in the allocated resource block. At 805, the MAC layer may send PHY layer one or multiple MAC PDU for one resource block with multiple subbands.

At 810, the PHY layer may perform a legacy data transmission (e.g., as depicted in FIG. 3 or 4) or a resource-saving data transmission according to the configuration information for resource-saving data transmission (e.g., as depicted in FIG. 5). For example, if "the allowable minimum number of subbands where LBT succeeds for DL/UL resource-saving transmission" is contained in the configuration information, the PHY layer may only perform DL/UL resource-saving transmission when the number of subbands where LBT succeeds is greater than the allowable minimum number. Otherwise, legacy transmission mode would be applied. In another example, if "the allowable maximum number of subbands where LBT fails for DL/UL resource-saving transmission" is contained in the configuration information, the PHY layer may perform DL/UL resource-saving transmission when the number of subbands where LBT fails is smaller than the allowable maximum number. Otherwise, legacy transmission mode may be applied, and no data would be transmitted at all.

At 815, the PHY layer may send a subband LBT failure indication to the MAC layer after the resource-saving data transmission is performed at PHY layer. Alternatively, an overall LBT failure indication showing LBT failure or success may be provided to MAC layer when legacy trans- mission mode is selected based on the configuration infor- mation for resources-saving data transmission. Furthermore, the subband LBT failure indication could contains the fol- lowing information:

Number of subbands where LBT fails

Index of subbands where LBT fails

Total data amount sent in the LBT-successful subbands

BWP index of the involved subbands

At 820, the MAC layer may decide the following data to be transmitted based on the received subband LBT failure indication or overall LBT failure indication from PHY layer.

Figure 9:
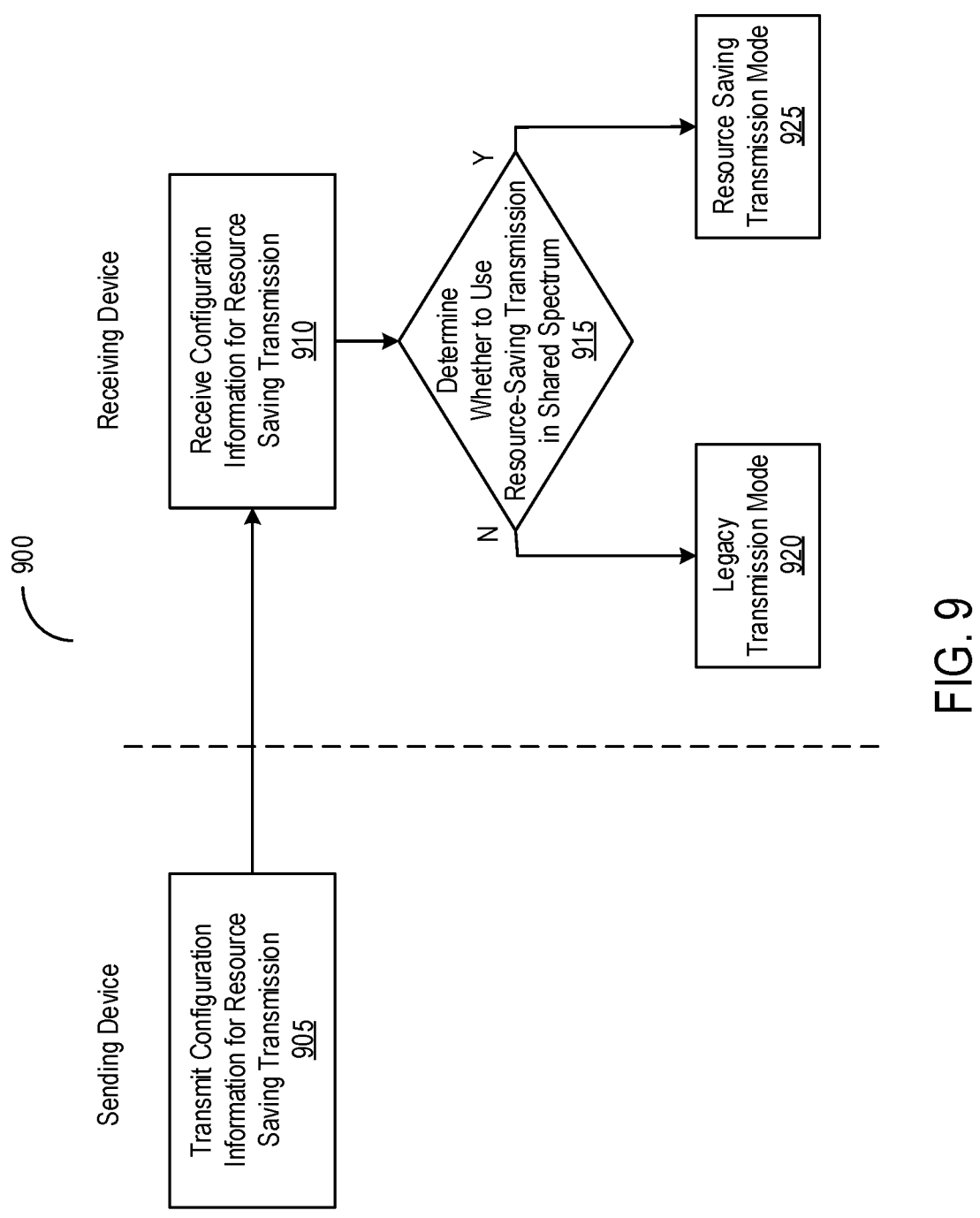
FIG. 9 illustrates a flow diagram of a method of configuration of resource-saving data transmission in shared spectrum channel access.

Referring now to FIG. 9, depicted is a flow diagram of a method 900 of configuration of resource-saving data trans- mission in shared spectrum channel access. The method 900 may be implemented or performed using any of the com- ponents (e.g., as detailed herein in conjunction with FIGS. 1-8). In brief overview, a sending device may transmit configuration information for resource saving transmission to a receiving device (905). The receiving device may receive the configuration information for resource saving transmission from the sending device (910). The receiving device may determine whether to use resource-saving trans- mission in shared spectrum (915). If resource-saving trans- mission is determined to be not used, the receiving device may operate under a legacy transmission mode (920). Oth- erwise, if resource-saving transmission is determined to be used, the receiving device may operate under a resource saving transmission mode (925).

The receiving and sending devices may correspond to one or more of the components in the system 100 or wireless communication system 200, among others. The receiving device may be generally referred herein as a first device and the sending device may be generally referred herein as a second device. In some embodiments, the receiving device may be, correspond to, or include a user equipment (UE) and the sending device may be, correspond to, or include a base station or a next-generation nodeB (gNB). In some embodi- ments, the receiving device may be, correspond to, or include a base station or a next generation nodeB (gNB), among others, and the second device may be, correspond to, or include a core network (CN) entity. In some embodi- ments, the CN entity may be, correspond to, or include an operations, administration and management (OAM) entity or an access and mobility management function (AMF), among others. In some embodiments, the receiving device may be, correspond to, or include a distributed unit (DU) of a next-generation nodeB (gNB) and the sending device may be, correspond to, or include a centralized unit (CU) of the next-generation nodeB (gNB).

In further detail, a sending device may provide, send, or otherwise transmit configuration information for resource saving transmission (also referred herein as high efficiency data transmission) to a receiving device (905). In some embodiments, the sending device may identify or generate the configuration information prior to transmission to the receiving device. The configuration information may include enabling information for the resource-saving trans- mission. In some embodiments, the sending device may send, provide, or transmit the configuration information via a system information block (SIB) (e.g., 605). The SIB may be generated to include the enabling information to convey to the receiving device as a system information (SI) message. In some embodiments, the sending device may send, provide, or transmit the configuration information via a dedicate radio resource control (RRC) signaling (e.g., RRC reconfiguration message 705). The RRC signaling may be generated to include the configuration information to pro- vide to the receiving device. In some embodiments, the sending device (e.g., a CU in a gNB) may send, provide, or transmit the configuration information via a F1 application protocol (F1AP) message to the receiving device (e.g., a DU in the gNB). The F1AP message may be communicated via an F1 interface between the sending device and the receiving device.

The receiving device may retrieve, identify, or receive the configuration information for resource saving transmission from the sending device (910). In some embodiments, the receiving device may retrieve, identify, or receive the con- figuration information via the SIB transmitted by the send- ing device. In some embodiments, the receiving device may retrieve, identify, or receive the configuration information via the dedicated RRC signaling (e.g., RRC Reconfiguration message 705) transmitted by the sending device. In some embodiments, the receiving device (e.g., a DU in a gNB) may retrieve, identify, or receive the configuration informa- tion via the F1AP message transmitted by the sending device (e.g., a CU in the gNB).

The configuration information may define, identify, or otherwise include one or more conditions under which resource-saving transmission is to be used or not used. In some embodiments, the configuration information may iden- tify, define, or otherwise include information to enable or carry out the resource-saving transmission. The configura- tion information may include enable information for down- link resource-saving transmission for each corresponding bandwidth part (BWP). The enable information may be for DL resource saving transmission for each BWP from the sending device (e.g., gNB or CU) to the receiving device (e.g., DU or CN entity such as an OAM entity or AFM). The configuration information may include enable information for downlink resource-saving transmission for all BWPs. The enable information may be for DL resource saving transmission for all BWPs from the sending device (e.g., gNB or CU) to the receiving device (e.g., DU or CN entity such as an OAM entity or AFM). The configuration infor- mation may include enable information for uplink resource- saving transmission for each corresponding BWP. The enable information may be for UL resource saving trans- mission for each BWP from the sending device (e.g., gNB) to the receiving device (e.g., UEs). The configuration infor- mation may include enable information for uplink resource- saving transmission for all BWPs. The enable information may be for UL resource saving transmission for all BWPs from the sending device (e.g., gNB) to the receiving device (e.g., UEs). The configuration information may include enable information for uplink resource-saving transmission for each corresponding BWP for use by a group of the receiving device (e.g., UEs connected to the gNB that corresponds to the sending device). The configuration infor- mation may enable information for uplink resource-saving transmission for all BWPs for use by a group of the receiving device (e.g., UEs connected to the gNB that corresponds to the sending device).

In some embodiments, the configuration information may include conditions specifying allowable characteristics for the LBT operations for downlink or uplink resource saving transmission. Each subband may correspond or associated with an independent LBT operation. The configuration information may include an allowable minimum number of subbands that each has a successful listen-before-talk (LBT) operation for downlink or uplink resource-saving transmission. The configuration information may include an allowable maximum number of subbands that each has a failed LBT operation for downlink or uplink resource-saving transmission. The configuration information may include an allowable minimum ratio of a number of subbands that each has a successful LBT operation, to a number of all subbands for downlink or uplink resource-saving transmission. The configuration information may include an allowable maximum ratio of a number of subbands that each has a failed LBT operation, to the number of all subbands for downlink or uplink resource-saving transmission. The configuration information may include a total number of failed LBT operations in all subbands during a specified time duration for downlink or uplink resource-saving transmission. The configuration information may include an index of an anchor subband whose LBT result determines whether to perform downlink or uplink resource-saving transmission.

In some embodiments, the configuration information may be included in one or more information elements (e.g., of the RRC signaling), such as:

a BWP-UplinkCommon,
    BWP-UplinkDedicated,
    BWP-DownlinkCommon,
    BWP-DownlinkDedicated,
    PUSCH-Config,
    PUSCH-ConfigCommon,
    PDSCH-Config, or
    PDSCH-ConfigCommon information element.

The receiving device may identify or determine whether to use resource-saving transmission in shared spectrum (915). The determination of whether to resource-saving transmission may be may be in accordance with the configuration information. In determining, the receiving device may identify one or more characteristics (e.g., regarding LBT operations) to compare against the one or more conditions of the configuration information to determine whether any or all satisfy. The conditions may include, for example: an allowable minimum number of subbands that each has a successful listen-before-talk (LBT) operation for downlink or uplink resource-saving transmission; an allowable maximum number of subbands that each has a failed LBT operation for downlink or uplink resource-saving transmission; an allowable minimum ratio of a number of subbands that each has a successful LBT operation, to a number of all subbands for downlink or uplink resource-saving transmission; an allowable maximum ratio of a number of subbands that each has a failed LBT operation, to the number of all subbands for downlink or uplink resource-saving transmission; a total number of failed LBT operations in all subbands during a specified time duration for downlink or uplink resource-saving transmission; and an index of an anchor subband whose LBT result determines whether to perform downlink or uplink resource-saving transmission, among others.

The receiving device may determine that none of the conditions defined by the configuration information satisfy. When none of the conditions are satisfied, the receiving device may determine to not use the resource-saving transmission. If resource-saving transmission is determined to be not used, the receiving device may operate under a legacy transmission mode (e.g., as depicted in FIGS. 3 and 4) (920). On other hand, the receiving device may determine that at least one of the conditions is satisfied. If at least one of the conditions is satisfied, the receiving device may determine to use the resource-saving transmission in the shared spectrum or unlicensed spectrum (NR-U). In some embodiments, in response to the configuration information, the receiving device may send, provide, or transmit a message (e.g., RRC Reconfiguration Complete 710 or a G1AP response message in a CU-DU architecture) to the sending device. The transmission of the message may be responsive to determining that the resource-saving transmission is to be used. The sending message may receive the message from the receiving device.

Otherwise, if resource-saving transmission is determined to be used, the receiving device may operate under a resource saving transmission mode (925). The operations of the resource saving transmission may be in accordance with the configuration information. In some embodiments, the receiving device may provide from a higher layer (e.g., MAC) to a lower layer (e.g., PHY) data (e.g., MAC PDU 805) for one or more resource blocks with multiple subbands. The data may include the configuration information. In some embodiments, the lower layer of the receiving device may in turn perform the resource saving transmission in accordance with the data and monitor for subband LBT failures in each subband. In some embodiments, the higher layer of the receiving device may retrieve, identify, or receive an indication of a subband LBT failure from the lower layer. The indication of the subband LBT failure may be generated from the lower layer in response to detecting the subband LBT failure. In some embodiments, the indication of the subband failure may include one or more of:

a number of the subbands where LBT fails,
    at least one index of a subband having a failed LBT operation,
    a total amount of data sent in one or more subbands having a successful LBT operation, or
    an index of a bandwidth part (BWP) of the subbands involved in the resource-saving transmission.

In some embodiments, the higher layer of the receiving device may determine data to be transmitted in accordance with the indication of the subband LBT failure. The determination may also be in accordance with the configuration information.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:

receiving, by a first device from a second device, configuration information that specifies a condition identifying a number of subbands in a plurality of subbands in an unlicensed spectrum where listen-before talk (LBT) succeeds or fails for a resource-saving transmission;

determining, by the first device, that the condition identifying the number of subbands where LBT succeeds is satisfied;

determining, by the first device in response to the condition being satisfied, that the resource-saving transmission is to be used to transmit data over one or more subbands of the plurality of subbands in a bandwidth part (BWP) where LBT succeeds in at least one of the plurality of subbands and the LBT fails in at least one other of the plurality of subbands in the unlicensed spectrum, according to the received configuration information;

generating, by a lower layer of the first device, an indication of an LBT failure in transmitting the data over a subband of the plurality of subbands, responsive to a failure of the LBT in the subband;

receiving, by a higher layer of the first device from the lower layer of the first device, the indication of the LBT failure in transmitting the data over the subband of the plurality of subbands in the BWP;

determining, by the higher layer of the first device, the data to be transmitted over the one or more subbands of the plurality of subbands in the BWP, according to the indication of the LBT failure received from the lower layer of the first device; and performing, by the higher layer of the first device, the resource-saving transmission to transmit the data over the one or more subbands of the plurality of subbands where the LBT succeeds in the BWP.

2. The method of claim 1, wherein the first device comprises a user equipment (UE), and the second device comprises a base station or a next-generation nodeB (gNB).

3. The method of claim 1, wherein the first device comprises a base station or a next-generation nodeB (gNB), and the second device comprises a core network entity.

4. The method of claim 3, wherein the core network entity comprises an operations, administration and management (OAM) entity or an access and mobility management function (AMF).

5. The method of claim 1, wherein the first device comprises a distributed unit (DU) of a next-generation nodeB (gNB), and the second device comprises a centralized unit (CU) of the next-generation nodeB (gNB).

6. The method of claim 1, comprising receiving, by the first device from the second device, the configuration information via a system information block (SIB), wherein the configuration information comprises enabling information for the resource-saving transmission.

7. The method of claim 1, comprising receiving, by the first device from the second device, the configuration information via a dedicated radio resource control (RRC) signaling.

8. The method of claim 1, comprising receiving, by the first device from the second device, the configuration information via a F1 application protocol (F1AP) message, wherein the first device comprises a distributed unit (DU) and the second device comprises a centralized unit (CU).

9. The method of claim 1, wherein the configuration information includes at least one condition, and the method comprises:
- determining, by the first device, that the at least one condition is satisfied; and
- determining, by the first device in response to the at least one condition being satisfied, to use the resource-saving transmission in the unlicensed spectrum.

10. The method of claim 1, wherein the configuration information includes at least one of:
- enabling information for downlink resource-saving transmission for each corresponding bandwidth part (BWP) of a plurality of BWPs from the second device to the first device;
- enabling information for downlink resource-saving transmission for the plurality of BWPs;
- enabling information for uplink resource-saving transmission for each corresponding BWP;
- enabling information for uplink resource-saving transmission for all BWPs;
- enabling information for uplink resource-saving transmission for each corresponding BWP for use by a group of the first device; or
- enabling information for uplink resource-saving transmission for all BWPs for use by a group of the first device.

11. The method of claim 7, wherein the configuration information is included in at least one information element, comprising: a BWP-UplinkCommon, BWP-UplinkDedicated, BWP-DownlinkCommon, BWP-DownlinkDedicated, PUSCH-Config, PUSCH-ConfigCommon, PDSCH-Config, or PDSCH-ConfigCommon information element.

12. The method of claim 1, wherein the indication of the LBT failure comprises at least one of: a number of subbands where LBT fails, at least one index of a subband having a failed LBT operation, a total amount of data sent in one or more subbands having a successful LBT operation, or an index of a bandwidth part (BWP) of subbands involved in the resource-saving transmission.

13. A first device comprising:
- at least one processor configured to:
  - receive, via a receiver from a second device, configuration information that specifies a condition identifying a number of subbands in a plurality of subbands in an unlicensed spectrum where listen-before talk (LBT) succeeds or fails for resource-saving transmission;
  - determine that the condition identifying the number of subbands where LBT succeeds is satisfied;
  - determine, in response to the condition being satisfied, that the resource-saving transmission is to be used to transmit data over one or more subbands of the plurality of subbands in a bandwidth part (BWP) where LBT succeeds in at least one of the plurality of subbands and the LBT fails in at least one other of the plurality of subbands in the unlicensed spectrum, according to the received configuration information;
  - generate, by a lower layer of the first device, an indication of an LBT failure in transmitting the data over a subband of the plurality of subbands, responsive to a failure of the LBT in the subband;
  - receive, by a higher layer from the lower layer, the indication of the LBT failure in transmitting the data over the subband of the plurality of subbands in the BWP;
  - determine, by the higher layer, the data to be transmitted over the one or more subbands of the plurality of subbands in the BWP, according to the indication of the LBT failure received from the lower layer of the first device; and
  - perform, by the higher layer of the first device, the resource-saving transmission to transmit the data over the one or more subbands of the plurality of subbands where the LBT succeeds in the BWP.

14. The first device of claim 13, wherein the first device comprises a user equipment (UE), and the second device comprises a base station or a next-generation nodeB (gNB).

15. The first device of claim 13, wherein the first device comprises a base station or a next-generation nodeB (gNB), and the second device comprises a core network entity.

16. The first device of claim 15, wherein the core network entity comprises an operations, administration and management (OAM) entity or an access and mobility management function (AMF).

17. The first device of claim 13, wherein the first device comprises a distributed unit (DU) of a next-generation nodeB (gNB), and the second device comprises a centralized unit (CU) of the next-generation nodeB (gNB).

18. The first device of claim 13, wherein the at least one processor is configured to receive, via the receiver from the second device, the configuration information via a system information block (SIB), wherein the configuration information comprises enabling information for the resource-saving transmission.

19. A method, comprising:
- transmitting, by a second device to a first device, configuration information that specifies a condition identifying a number of subbands in a plurality of subbands in an unlicensed spectrum where listen-before talk (LBT) succeeds or fails for a resource-saving transmission; and
- causing the first device to:
  - determine that the condition identifying the number of subbands where LBT succeeds is satisfied;

determine, in response to the condition being satisfied, that the resource-saving transmission is to be used to transmit data over one or more subbands of the plurality of subbands in a bandwidth part (BWP) where LBT succeeds in at least one of the plurality of subbands and the LBT fails in at least one other of the plurality of subbands in the unlicensed spectrum, according to the configuration information;

generate, by a lower layer of the first device, an indication of an LBT failure in transmitting the data over a subband of the plurality of subbands, responsive to a failure of the LBT in the subband;

receive, by a higher layer of the first device from the lower layer of the first device, the indication of the LBT failure in transmitting the data over the subband of the plurality of subbands in the BWP;

determine, by the higher layer of the first device, the data to be transmitted over the one or more subbands of the plurality of subbands in the BWP, according to the indication of the LBT failure received from the lower layer of the first device; and perform, by the higher layer of the first device, the resource-saving transmission to transmit the data over the one or more subbands of the plurality of subbands where the LBT succeeds in the BWP.

20. The method of claim 1, wherein the configuration information includes an indication of at least one of:

an allowable minimum number of subbands that each has a successful listen-before-talk (LBT) operation for downlink or uplink resource-saving transmission;

an allowable maximum number of subbands that each has a failed LBT operation for downlink or uplink resource-saving transmission;

an allowable minimum ratio of a number of subbands that each has a successful LBT operation, to a number of all subbands for downlink or uplink resource-saving transmission;

an allowable maximum ratio of a number of subbands that each has a failed LBT operation, to the number of all subbands for downlink or uplink resource-saving transmission;

a total number of failed LBT operations in all subbands during a specified time duration for downlink or uplink resource-saving transmission; or an index of an anchor subband whose LBT result determines whether to perform downlink or uplink resource-saving transmission.

* * * * *